May 8, 1962  A. WINKLER  3,033,090
EXPOSURE METER AND VIEW FINDER ARRANGEMENTS
FOR PHOTOGRAPHIC CAMERAS
Filed July 8, 1958  2 Sheets-Sheet 1

INVENTOR.
Alfred Winkler
BY Michael S. Striker
Attorney

May 8, 1962 A. WINKLER 3,033,090
EXPOSURE METER AND VIEW FINDER ARRANGEMENTS
FOR PHOTOGRAPHIC CAMERAS
Filed July 8, 1958 2 Sheets-Sheet 2

INVENTOR.
Alfred Winkler
BY Michael S. Striker
Attorney

United States Patent Office 3,033,090
Patented May 8, 1962

3,033,090
EXPOSURE METER AND VIEW FINDER ARRANGEMENTS FOR PHOTOGRAPHIC CAMERAS
Alfred Winkler, Munich, Germany, assignor to Agfa Aktiengesellschaft, Leverkusen-Bayerwerk, Germany
Filed July 8, 1958, Ser. No. 747,180
Claims priority, application Germany July 9, 1957
11 Claims. (Cl. 95—10)

The present invention relates to photographic cameras.

More particularly, the present invention relates to photographic cameras provided with view finders and in which images of frame limits and an exposure meter pointer are visible in the view finder field. Sets of frame limits which correspond respectively to objectives of different focal lengths are projected into the viewing field to indicate to the operator the frame limits of the particular objective which is being used. The pointer of an exposure meter which forms part of the camera is also projected into the viewing field to assist the operator in the proper setting of the exposure aperture and/or exposure time.

In conventional cameras of this type the pointer of the exposure meter is arranged directly in front of and parallel to the plate which carries the frame limits, and the exposure meter itself is located beneath the latter plate. This conventional arrangement is disadvantageous, however, in that it requires a considerable amount of space and makes the upper part of the camera undesirably high in order to accommodate the exposure meter.

One of the objects of the present invention is to overcome these drawbacks by providing a camera capable of projecting images of frame limits and an exposure meter pointer into the viewing field without, however, requiring the undesirably large space and height of conventional cameras which also project these images into the view finder field.

Another object of the present invention is to provide a photographic camera with a view finder, range finder, frame limit and exposure meter pointer projection system as well as an exposure meter, all of which are arranged in a relatively small amount of space and all of which operate harmoniously to provide in the view finder field not only an image of the subject to be photographed, but also images of the frame limits and exposure meter pointer as well as the possibility of using the view finder in conjunction with a range finder and the possibility of rendering movement of the exposure meter pointer visible in the view finder field for the purpose of properly setting the exposure adjustments of the camera.

A further object of the present invention is to provide a camera of the above type in which the exposure pointer itself is directly visible to the operator.

An additional object of the present invention is to provide a structure capable of accomplishing all of the above objects and at the same time being relatively simple and inexpensive to manufacture.

With the above objects in view the present invention includes in a photographic camera a view finder means having a viewing field as well as a plurality of frame limits respectively corresponding to objectives of different focal lengths and an exposure meter pointer. In accordance with the present invention the exposure meter pointer and the plurality of frame limits are spaced substantially from each other with the pointer located beyond the region where the frame limits are located. A projecting means cooperates with the frame limits as well as the exposure meter pointer and with the view finder means for projecting into the viewing field of the latter images of the frame limits and the exposure meter pointer. Preferably, the exposure meter pointer and the frame limits are respectively located in mutually perpendicular focal planes of the projecting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
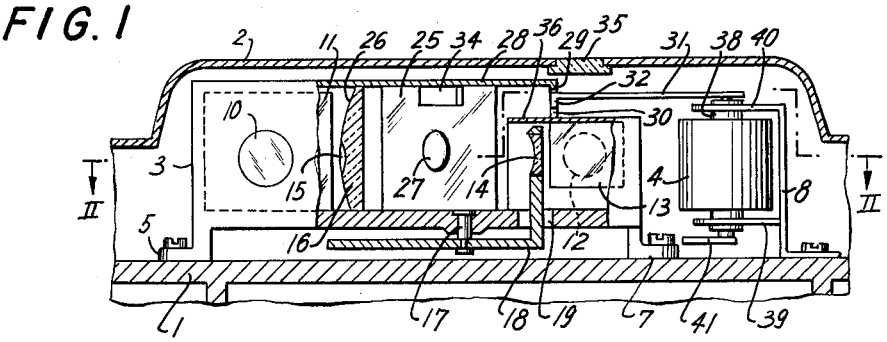
FIG. 1 is a fragmentary sectional elevational view of the upper part of a camera which includes the structure of the present invention.
Figure 2:
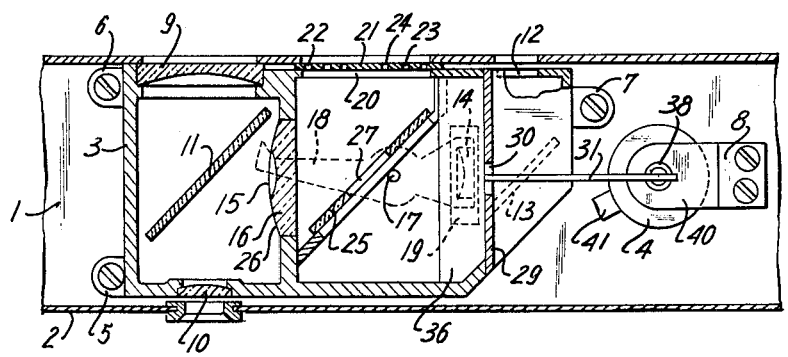
FIG. 2 is a sectional plan view of the structure of FIG. 1 taken along the line II—II of FIG. 1 in the direction of the arrows.

FIGS. 1 and 2 show the upper wall 1 of the camera housing, a cover 2 cooperating with the upper wall 1 in a known way to form a chamber over the camera housing. Within this chamber is located a housing 3 of a view finder means and a range finder means which cooperates with the view finder means, and a measuring instrument 4 of a photoelectric exposure meter which is not further illustrated is also located in this chamber. The housing 3 is fastened to the wall 1 through the angle members 5–7, while the instrument 4 is carried by a support means 8 which is fixed to the wall 1 and which is described in greater detail below.

The view finder means includes the view finder objective 9 located at a view finder aperture of the cover 2, the ocular 10 and the semi-transparent reflector 11 through which the subject may be seen and which also operates to reflect an image to the ocular 10, in a well known manner.

Figure 4:
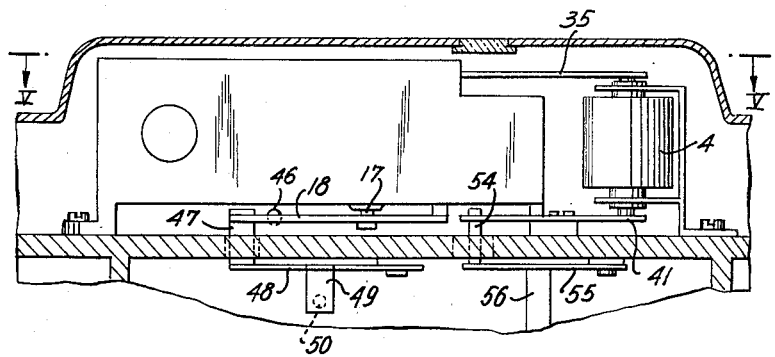
FIG. 4 is a fragmentary sectional elevational view corresponding to FIG. 1 and showing further structure which is not illustrated in FIG. 1.

The range finder means includes a range finder aperture 12 formed in the cover 2 and aligned with an aperture in the housing 3, the reflector 13 arranged behind the aperture 12 for directing light toward the view finder, the turnable lens 14, and the central portion 15 of a bifocal lens 16. Through this optical system an image is directed to the semi-transparent reflector 11 to be reflected from the latter to the ocular, and in this way when the images seen through and reflected by the semi-transparent reflector 11 are in proper position with respect to each other the operator knows that the objective is set accurately with respect to the distance from the camera to the subject. The turnable lens 14 is carried by a two-armed lever 18 pivotally supported by a pivot pin 17 carried by the lower wall of the housing 3. The end of the lever 18 distant from the lens 14 is connected with the camera objective, as described below in connection with FIGS. 4 and 5. The right end of the lever 18, as viewed in FIG. 1, is connected with an upwardly directed member which extends through a cutout 19 of the bottom wall of the housing 3 and which directly carries the lens 14.

The cover 2 as well as the housing 3 are also formed with aligned apertures in which frame limits are located. These frame limits are in the form of cutouts 22, 23, 24 formed in a plate 21 supported at the aperture 20 in the manner shown in FIG. 2, so that light passing through the cutouts 22–24 of the plate 21 will form images of frame limits respectively corresponding to objectives of different focal lengths. Within the housing 3 is located a reflector 25 arranged behind the plate 21 for reflecting images of the frame limits through the outer annular portion 26 of the bifocal lens 16 to the semi-transparent reflector 11, so that in this way a projecting means is provided for projecting into the viewing field of the view finder images of the frame limits 22–24. The outer annular portion 26 of the bifocal lens 16 cooperates with the ocular 10 to provide in the viewing field of the view finder frame limiting images which are located at infinity. It is possible for all three sets of frame limits to be viewed simultaneously, and the operator need then only remember which set of frame limits corresponds to the particular objective which is being used. However, it is also possible to provide an unillustrated known mechanism for covering the sets of frame limits which do not correspond to the particular objective which is being used so that only the frame limits which pertain to the objective connected with the camera will be projected into the viewing field. The reflector 25 is provided with a central cutout 27 through which the range finder light rays pass without obstruction, so that the projecting means for projecting the frame limit images does not interfere with the range finder means.

At its upper right portion, as viewed in FIG. 1, the top wall 28 of the housing 3 is stepped so as to have a vertical wall portion 29 extending forwardly and rearwardly of the camera, and this wall portion 29 is formed with a cutout 30 into which the end 32 of an exposure meter pointer 31 extends. This end 32 of the exposure meter pointer 31 extends downwardly at a right angle from the remainder of the pointer 31. At the lower edge of the cutout 30 the wall portion 29 is provided with a stationary index member which forms an index which cooperates with the end 32 of the pointer 31 so that the pointer 31 can be aligned with this index.

As may be seen from FIG. 2, the cutout 30 is at the same optical distance from the bifocal lens 16 as the plate 21 although the cutout 30 and the plate 21 are located in mutually perpendicular focal planes of the projecting means 25, 26, 11, 10. Moreover, the reflector 25 is formed at its top edge with a cutout 34 aligned with the cutout 30. Thus, the end 32 of the pointer 31 can be projected into the viewing field by light rays passing through the cutouts 30 and 34 to the peripheral portion 26 of the bifocal lens 16 and from the latter to the reflector 11 and ocular 10. Also, the index at the lower edge of the cutout 30 will provide an index image in the viewing field of the view finder in the same way. These images of the end 32 of pointer 31 and the index are also located at infinity in the viewing field of the view finder. To illuminate the pointer of the exposure meter the top wall of the cover 2 is formed with an aperture at which a window means 35 is located so that light may enter through the window 35 to the pointer 31 to illuminate the end 32 thereof so as to provide light for the projection of images of the end 32 of pointer 31 as well as other objects located in the cutout 30. Moreover, the pointer 31 is directly visible to the operator through the window 35.

In order to prevent light which enters through the window means 35 from interfering with the other images visible in the view finder field, a screen means is provided in addition to the reflector 25 which in itself acts as a screen. This screen means includes a screen member 36 carried by the housing 3 between the cutout 30, on the one hand, and the reflector 13 and lens 14 of the range finder means, on the other hand. Thus, the light entering through the window 35 will not interfere with range finder light which enters through the apertures 12.

The measuring instrument 4 of the exposure meter is provided at its bottom end with a downwardly directed circular projection 37 which is turnably supported by the lower wall 39 of the support means 8. At its top end the instrument 4 is provided with an annular upwardly directed projection 38 coaxial with projection 37 and the turning axis of the pointer 31 and turnably supported by the upper wall 40 of the support means 8, so that in this way, the measuring instrument 4 is turnably supported. A fragmentarily illustrated lever 41 is connected to the lower projection 37 of the instrument 4 and is connected with the structure of the camera which adjusts the exposure aperture of the camera and the exposure time, as described below in connection with FIGS. 4 and 5. Thus, when the lever 41 turns the instrument 4 will turn and the pointer 31 will turn together with the instrument 4.

Figure 3:
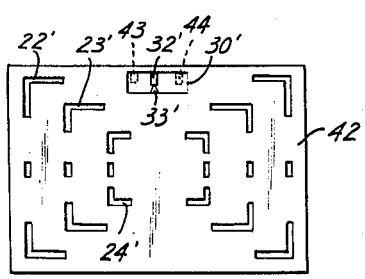
FIG. 3 is an illustration of the viewing field of the view finder of the structure of FIGS. 1 and 2.

FIG. 3 shows the viewing field 42 of the view finder. When the operator looks through the ocular 10, not only will the subject be seen in the view finder field 42, but also images 22', 23', 24' of the frame limits 22–24, respectively, as well as an image 30' of the cutout 30, an image 32' of the end 32 of the pointer 31, and an image 33' of the index carried by the wall portion 29 at the lower edge of the cutout 30. The operator adjusts the exposure aperture and exposure time of the camera to turn the instrument 4 about its axis until the image 32' is aligned with the index image 33', and then the operator knows that the camera has been set to make the proper exposure. In order to guarantee that the image 32' is at all times visible in the viewing field, the wall portion 29' is provided at the top edge of the cutout 30 with a pair of downwardly directed stop members 43 and 44 which limit the turning of the pointer 31 by engaging the end 32 thereof, so that the pointer cannot turn beyond the space between the stops 43 and 44, and of course images of these stops will appear in the viewing field 42, as shown by the dotted lines in FIG. 3.

Figure 5:
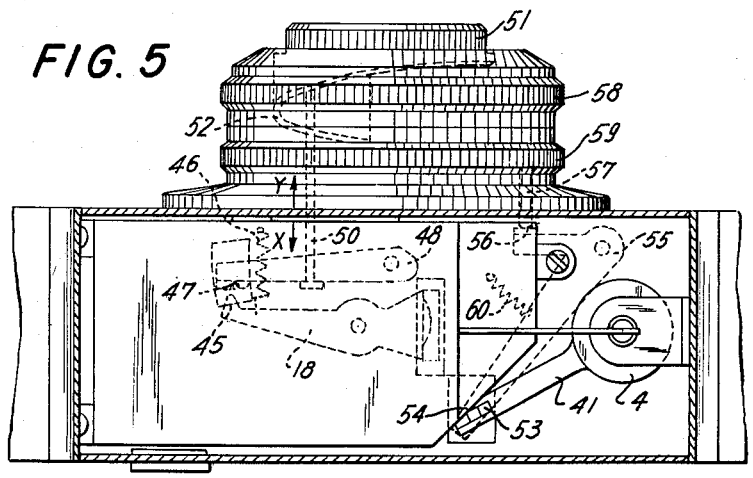
FIG. 5 is a fragmentary plan view taken along line V—V of FIG. 4 in the direction of the arrows.

As may be seen from FIG. 5, the free end of the two-armed lever 18 is provided with a projection 45, and a spring 46 acts on the lever 18 to maintain the projection 45 in constant engagement with an upwardly directed lug 47 of a one-armed lever 48, this lug 47 extending upwardly through an opening in the top wall of the housing 1. This opening is curved about the turning axis of the lever 48, as is apparent from FIG. 5, and the lever 48 is pivotally connected to the underside of the top wall of the housing 1.

The lever 48, in addition to being provided with the upwardly directed lug 47, is provided with a downwardly directed lug 49, and one end of a rod 50 is in constant engagement with the downwardly directed lug 49. The rod 50 extends parallel to the optical axis and is supported by suitable unillustrated bearings for axial shifting movement. The rod 50 is limited to axial movement and has its end distant from the lug 49 in engagement with a helical surface of a cam 52 which is concentric with the optical axis. The cam 52 is fixed to the rotatable objective carrier 51 for turning movement therewith.

When the objective carrier 51 is adjusted the cam 52 also turns and produces an axial shifting of the rod 50 in the direction of the arrow $x$ or in the direction of the arrow $y$ shown in FIG. 5. It is apparent that the spring 46 maintains the projection 45 in engagement with lug 47 and the ends of rod 50 in engagement with lug 49 and cam 52, respectively. Thus, when the objective carrier 51 is turned in one direction or the other the rod 50 will shift in the direction of arrows $x$ or $y$ and the lever 18 will necessarily follow this movement so as to automatically control the position of the lens 14.

The objective assembly shown diagrammatically in FIG. 5 includes adjusting rings 58 and 59 for the diaphragm aperture and exposure time, respectively, and these adjusting devices may be coupled to each other. These adjusting devices operate through an unillustrated totalizing drive which is per se known on an axially movable pin 57 whose axial position is thus indicative of the combination of the aperture and exposure time settings of the camera. A free end of the pin 57 bears against a downwardly directed lug 56 of a bell crank 55 which is pivotally supported at the underside of the top wall of the housing 1 and which is urged in a clockwise direction, as viewed in FIG. 5, so as to maintain the lug 56 in engagement with the pin 57 and thus the angular position of bell crank 55 is also indicative of the combined settings of the aperture and exposure time of the camera. The arm of the bell crank 55 which does not have the lug 56 is connected to one end of a coil spring 60 which acts on the bell crank to maintain the lug 56 in engagement with the pin 57, and this arm which is connected to the spring 60 fixedly carries a pin 54 extending upwardly through an opening in the top wall of the housing 1 into an elongated cutout 53 extending longitudinally along the lever 41 which is fixed to the projection 37 of the instrument 4, as described above.

Upon adjustment of rings 58 and/or 59 the pin 57 moves axially and turns the bell crank 55 or causes it to be turned by the spring 60, so that the lever 41 and the instrument 4 also turn, and these adjustments are carried out until the pointer 31 has its image 32' of its end 32 aligned with the image 33' of the index, as was pointed out above.

The movement of the pointer 31 is visible not only in the view finder, but also directly through the window 35.

The above-described arrangement of the end 32 of the pointer 31 in a second focal plane of the projecting means 25, 26 perpendicular to the focal plane in which the plate 21 is located may also be used in cameras which have a view finder, but no range finder.

Moreover, the galvanometer pointer 31 may be located beneath the range finder means rather than over the range finder means.

The above-described arrangement of the exposure meter is also of advantage even where a plate 21 having frame limits 22–24 is not present.

It will be understood that each of the elements described above, or two or more together, may also find a useful application in other types of cameras differing from the types described above.

While the invention has been illustrated and described as embodied in a camera capable of providing a plurality of images in the view finder field, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, view finder means having a viewing field and including a semi-transparent reflector; a plurality of frame limits respectively corresponding to objectives of different focal lengths and located in a first plane beside said view finder means; an exposure meter pointer located beyond the region where said frame limits are located and having an indicating portion in a second plane perpendicular to said first plane; a second reflector located behind said frame limits and directing an image thereof toward said semi-transparent reflector; and projecting lens means between said reflectors cooperating with said frame limits and indicating portion of said pointer and with said view finder means for projecting into said viewing field thereof images of said frame limits and indicating portion of said pointer, said planes being mutually perpendicular focal planes of said projecting lens means.

2. In a camera as recited in claim 1, said second reflector being formed with a cutout aligned with said indicating portion of said pointer.

3. In a camera as recited in claim 1, range finder means cooperating with said view finder means.

4. In a camera, as recited in claim 1, range finder means cooperating with said view finder means; and screen means located between said pointer and range finder means for screening said pointer from said range finder means.

5. In a camera as recited in claim 1, and window means through which said pointer is visible and through which light moves to said pointer.

6. In a photographic camera as recited in claim 1, a housing having a wall portion formed with a cutout, said view finder means being located in said housing and said exposure meter pointer being located outside of said housing in the path of light passing through said cutout.

7. In a photographic camera as recited in claim 6, said pointer extending into said cutout.

8. In a photographic camera as recited in claim 6, said wall portion of said housing forming part of a stepped wall of said housing.

9. In a camera, as recited in claim 1, an index with which said exposure meter pointer cooperates; an exposure meter carrying said pointer; support means supporting said meter together with said pointer for turning movement; and lever means operatively connected with said exposure meter for turning the latter together with said pointer when a device for adjusting the exposure of film in the camera is moved.

10. In a photographic camera, in combination, a view finder objective; a view finder ocular arranged behind said objective; a semi-transparent first reflector located between said objective and ocular; frame limits limited beside said objective; a second reflector located behind said frame limits and formed with a central cutout, the latter reflector reflecting images of the frame limits toward said semi-transparent reflector; a bifocal lens located between said reflectors and having an outer annular portion which cooperates with said second reflector and said ocular for providing an image of said frame limits at infinity in the viewing field; a wall portion formed with a range finder aperture located beside said frame limits on the side thereof opposite from said objective; a third reflector located behind said range finder aperture for directing light rays received from the latter aperture through said central cutout of said second reflector and through a central portion of said bifocal lens to said semi-transparent reflector; a range finder lens located between said third reflector and said central cutout of said second reflector; and an exposure meter pointer located at an elevation different from and overlapping said third reflector, said pointer having a free end located at the same optical distance from said bifocal lens as said frame limits and said second reflector being formed with a second cutout aligned with the end of said pointer and the outer annular portion of said bifocal lens so that an image of said pointer is also projected into the viewing field by said annular portion of said bifocal lens.

11. In a camera, in combination, view finder means having a viewing field and including a semi-transparent reflector; frame limits located in a first plane beside said view finder means; an exposure meter pointer located beyond the region where said frame limits are located and having an indicating portion in a second plane perpendicular to said first plane; a second reflector located behind said frame limits and directing an image thereof toward said semi-transparent reflector; and optical means including at least a projecting lens located between said reflectors, said optical means cooperating with said frame limits and indicating portion of said pointer and with said view finder means for projecting into said viewing field thereof images of said frame limits and indicating portion of said pointer, said planes being mutually perpendicular focal planes of said optical means.

References Cited in the file of this patent

UNITED STATES PATENTS

| | | |
|---|---|---|
| 2,242,043 | Sanger | May 13, 1941 |
| 2,250,898 | Tonnies | July 29, 1941 |
| 2,297,428 | Nuchterlein | Sept. 29, 1942 |
| 2,554,798 | Schwartz | May 29, 1951 |
| 2,805,608 | Leitz | Sept. 10, 1957 |

FOREIGN PATENTS

| | | |
|---|---|---|
| 466,923 | Great Britain | June 8, 1937 |